US008065036B2

United States Patent
Linke et al.

(10) Patent No.: US 8,065,036 B2
(45) Date of Patent: Nov. 22, 2011

(54) ELECTRICAL EQUIPMENT FOR MATERIAL FLOW COORDINATION BETWEEN A PLURALITY OF CONVEYORS, WHICH ARE MECHANICALLY CONNECTED TO ONE ANOTHER, FOR CONVEYING PIECE GOODS

(75) Inventors: Martin Linke, München (DE); Alois Lorenz, Griesbach (DE); Frank Steins, Neuss (DE)

(73) Assignee: Siemens Aktiengesellschaft, Munich (DE)

( * ) Notice: Subject to any disclaimer, the term of this patent is extended or adjusted under 35 U.S.C. 154(b) by 186 days.

(21) Appl. No.: 12/380,787

(22) Filed: Mar. 3, 2009

(65) Prior Publication Data

US 2009/0228141 A1   Sep. 10, 2009

(30) Foreign Application Priority Data

Mar. 10, 2008   (DE) .................. 10 2008 013 372

(51) Int. Cl.
*G06F 7/00* (2006.01)

(52) U.S. Cl. ........................................................ 700/230
(58) Field of Classification Search ................... 700/230
See application file for complete search history.

(56) References Cited

U.S. PATENT DOCUMENTS

| 7,158,856 | B2* | 1/2007 | Sheehan et al. | 700/216 |
| 7,360,638 | B2* | 4/2008 | Ko et al. | 198/575 |
| 2004/0186615 | A1* | 9/2004 | Wielebski et al. | 700/224 |
| 2006/0272929 | A1* | 12/2006 | Taylor | 198/781.06 |
| 2006/0293782 | A1* | 12/2006 | Rees | 700/230 |

* cited by examiner

*Primary Examiner* — Ramya Prakasam

(57) ABSTRACT

The electrical equipment of mechanical conveyors and the associated material flow coordination between them, when a plurality of conveyors for conveying piece goods is connected, are provided. Intelligent motor starters are included, which are associated with the individual conveyors and respectively combine an autonomous totality composed of logic modules, and which are programmable with the functions required for material flow coordination, corresponding to the characteristics of the conveyor.

11 Claims, 1 Drawing Sheet

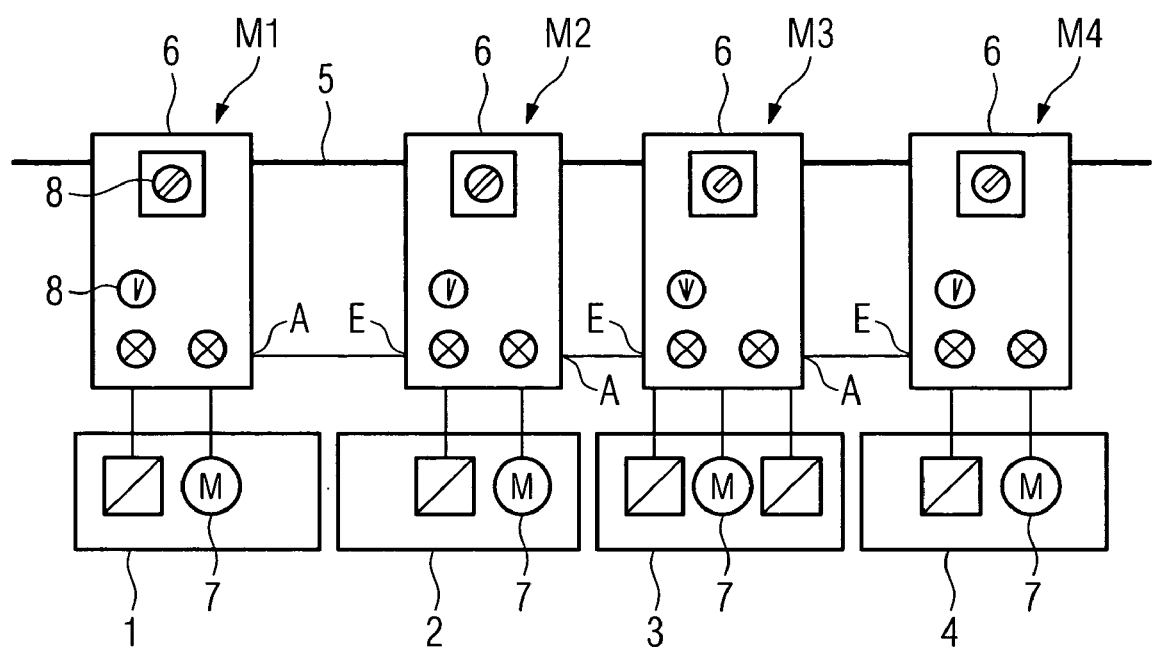

ELECTRICAL EQUIPMENT FOR MATERIAL FLOW COORDINATION BETWEEN A PLURALITY OF CONVEYORS, WHICH ARE MECHANICALLY CONNECTED TO ONE ANOTHER, FOR CONVEYING PIECE GOODS

CROSS REFERENCE TO RELATED APPLICATIONS

This application claims priority of German application No. 10 2008 013 372.8 DE filed Mar. 10, 2008, which is incorporated by reference herein in its entirety.

FIELD OF INVENTION

The present invention relates to the electrical equipment of mechanical conveyors and to the material flow coordination between them associated with this, when a plurality of conveyors are connected.

BACKGROUND OF INVENTION

In a general form, the expression conveyors covers logically controlled conveyor techniques, such as roller conveyors, conveyor belts and chain conveyors for conveying piece goods.

In logistics, piece goods are transported between goods inwards and goods outwards inter alia on conveyors whose aim is to sort the piece goods and/or to distribute them, and/or to place them in store, to commission them or to supply them to workstations or machines for further processing. This relates in particular to piece goods from dispatch logistics, such as cartons, containers and packets, irrespective of whether these are in the singular form or are in the bulk material flow. The conveyors used are in general electrically powered and transport said piece goods by carrying them to the predetermined destination.

Small and medium-size logistic solutions with low-level requirements in the material flow for the conveyors have a restricted performance spectrum for good solutions, or, depending on the solution requirement, they suffer from high costs in the basic outlay, as well as costs resulting from individual configurations.

It is known for electrical microcontroller boards to be used on the conveyor. These carry out the function of operating the drives and the coordinating the material flow between the two conveyors in a predecessor/successor relationship. In general, the microcontroller boards are specific solutions from the conveyor manufacturer and are designed and built for this specific conveyor, that is to say they are not readily interchangeable. Furthermore, the use of microcontroller boards on extra-low-voltage drives (for example 24 V or 48 V) is restricted, as, therefore, is the performance of the drives and the load of the piece goods, as well.

The functionality of the known solution is provided by the controller board with an external bus coupling; extensions are, however, restricted within the predetermined product functionality and are possible only by the manufacturer, and extensions cannot be implemented by the customer. Although the basic complexity is low in this known solution, the system is, however, inflexible.

Furthermore, conveyors are known which are controlled by programmable logic controllers (PLC) which record the status of the conveyor and monitor the transfer of piece goods. In this case, low-voltage drives (for example 400 V) are also used, in addition to extra-low voltage drives. The power is supplied and signal connections made centrally or locally (bus-oriented). The functionality is defined individually in the PLC, and extensions to the logistic installation always require software changes in the PLC by the supplier or the customer. Because of the individuality that is required in some cases, the basic complexity is high, in particular for small to medium logistic solutions with low-level requirements for the material flow.

This solution also makes use of motor starters which are mounted decentralized on the conveyor or on the electrical drive. Depending on the functionality, these are completely controlled by central logic or have the capability to carry out the status monitoring for the drive, in order to reduce the load on the central logic. However, they do not have the capability to coordinate the material flow between two conveyors without superordinate logic with bus networking, for example control by a PLC.

SUMMARY OF INVENTION

The invention is based on the object of providing an intelligent, cost-effective and highly reliable system for driving a plurality of conveyors which are connected to one another, which system makes it possible, with little complexity, to connect the mechanical and electrical parts of the conveyors to one another on a modular basis, and to extend or to change them when necessary.

In order to achieve the object, a system is proposed having the features described in the independent claims, and refinements of the invention are specified in the dependent claims.

The intelligent motor starters which are connected to one another are independent of superordinate programmable logic controllers, microcontrollers, bus systems etc. The conveyors which are equipped with the motor starters according to the invention can be operated on a stand-alone basis and they are able, by interchanging signals with one another, to coordinate digital inputs and outputs of predecessor and successor relationships between two conveyors, in order to transfer piece goods.

The logic modules that are created are programmed with the required functions, and each module is considered with defined characteristics, based on the characteristics of the conveyor. The invention therefore creates an autonomous totality composed of the logic modules. The elements required for voltage supply, switching devices, control and status-indication elements and interfaces are preferably combined in a switch box to form the intelligent motor starter, which is considered to be a technical product with defined characteristics.

The use of standard industrial components in the intelligent motor starter developed from this results in independence from the manufacturer of the conveyor, and from the manufacturer's version of the conveyor. Furthermore, the standard industrial components have high reliability, which is generally subject to control by standards and certification by independent test organizations. Different conveyors with extra-low voltage or low-voltage drives can be connected to one another using the system according to the invention without any need for individual adaptations (for example in a programmable logic controller) to software and hardware.

The functionality is stored and written in the logic modules. The different characteristics of the conveyors can be taken into account by different intelligent motor starters. Standard interfaces between the motor starters allow mutual configuration to form a logistic solution, which is standard overall, with the individual conveyors. There is no need for any superordinate logic in this case. All the required control and status elements can be provided on the motor starter.

Extensions and changes within the logistic solution can be achieved by connection of the intelligent motor starter and of the conveyor to be added. There is no need for programming knowledge for this purpose, since the elements are configured and connected. This considerably reduces the effort required to set up an installation composed of conveyors. In many cases, in particular for small to medium-sized logistic solutions, the functionality in the product spectrum of the intelligent motor starters is adequate.

Cost and quality advantages can therefore be expected by project-neutral manufacturing configuration in large quantities; project implementation times and delivery times are thus reduced.

BRIEF DESCRIPTION OF THE DRAWINGS

The single figure in the drawing illustrates, highly schematically, four conveyors 1 to 4 which belong to a conveyor installation and, according to the invention, are each linked to an intelligent motor starter M1-M4.

DETAILED DESCRIPTION OF INVENTION

The motor starters M1 to M4 are supplied with the required power by a power bus 5. According to the invention, each motor starter can be operated on a stand-alone basis, although, as in the illustrated example, it can be linked via digital inputs and outputs E and A to adjacent motor starters M1 to M4, with the motor starters M1 to M4 being programmed with the required functions. As illustrated, motor starters with direct drive functionalities M1, M2 and M4 can be connected via the standard interfaces of the digital inputs and outputs E and A to the appropriately programmed motor starter M3 for a reversing drive.

The motor starters M1 to M4 are each arranged in a switch box 6, which contains the necessary elements for the voltage supply for the motors 7 and for their control, the switching devices and the interfaces, and which, as can be seen, is fitted with the control and status-indication elements 8.

The invention claimed is:

1. Electrical equipment for material flow comprising:
    a plurality of separate conveyors, each mechanically connectable, one to another, without need for any individual hardware or software adaptations, the conveyors connected for conveying piece goods; and
    a plurality of intelligent motor starters connected to one another, each of the motor starters associated with an individual conveyor, the combined plurality providing a conveyor system operable in an autonomous manner, independent of and without any super ordinate controller or bus system while, in the absence of both any such super ordinate controller and any such bus system, piece goods are transferred between two of the conveyors in the conveyor system based on an interchange of signals with one another, wherein the intelligent motor starters function as logic modules, each user programmable to effect material flow coordination between a pair of the connected conveyors.

2. The electrical equipment as claimed in claim 1, wherein a standard interface between the plurality of intelligent motor starters for mutual configuration forms an overall standard logistic solution for the conveyors.

3. The electrical equipment of claim 2, wherein a predecessor and a successor relationship is coordinated between a pair of conveyors via exchange of a plurality of digital inputs and a plurality of outputs between the intelligent motor starters in the pair in order to transfer piece goods between the pair of conveyors.

4. The electrical equipment of claim 1 further including a plurality of switch boxes, wherein (i) each intelligent motor starter is positioned in one of the switch boxes and (ii) each combination of a motor starter in a switch box provides a voltage supply for a motor and control of the motor.

5. The electrical equipment of claim 4, wherein the switch boxes comprise: elements for providing a voltage supply, a plurality of switching devices, a plurality of control elements; a plurality of status-indication elements; and interfaces.

6. The electrical equipment of claim 4, wherein a plurality of different conveyor functionalities are stored among different ones of the intelligent motor starters.

7. The electrical equipment of claim 2, wherein a plurality of extensions and a plurality of changes within the logistic solution are made by connection of a plurality of intelligent motor starters to a plurality of conveyors.

8. The electrical equipment of claim 1, wherein each motor starter can be linked to adjacent motor starters for said interchange of signals with one another and can also be operated independently of the adjacent motor starters on a stand-alone basis.

9. The electrical equipment of claim 1, wherein the intelligent motor starters have different functionalities, the respective functionality of the motor starters being written and stored in the programmable logic module respectively associated with the motor starters.

10. The electrical equipment of claim 9, wherein the different functionalities are in relation to different characteristics of the conveyors associated with the intelligent motor starters.

11. The electrical equipment of claim 1, wherein at least one motor starter can be programmed for a reversing drive.

* * * * *